US009072368B2

(12) United States Patent
Mueller (10) Patent No.: US 9,072,368 B2
(45) Date of Patent: Jul. 7, 2015

(54) SUPPORTING A HAMMOCK ON A VEHICLE (71) Applicant: John H. Mueller, Savannah, GA (US)

(72) Inventor: John H. Mueller, Savannah, GA (US)

(73) Assignee: John H. Mueller, Savannah, GA (US)

( * ) Notice: Subject to any disclaimer, the term of this patent is extended or adjusted under 35 U.S.C. 154(b) by 10 days.

(21) Appl. No.: 13/901,998

(22) Filed: May 24, 2013

(65) Prior Publication Data

US 2014/0345048 A1 Nov. 27, 2014

(51) Int. Cl.
*B63B 17/00* (2006.01)
*A45F 3/24* (2006.01)
*A47C 17/80* (2006.01)
*A45F 3/22* (2006.01)
*B63B 29/06* (2006.01)

(52) U.S. Cl.
CPC . *A45F 3/24* (2013.01); *A47C 17/80* (2013.01); *A45F 3/22* (2013.01); *B63B 17/00* (2013.01); *B63B 29/06* (2013.01)

(58) Field of Classification Search
CPC ............. A45F 3/20; A45F 3/24; A47C 17/80; B63B 17/00; B63B 29/06
USPC .................. 5/120–129, 139, 130; 296/100, 16
See application file for complete search history.

(56) References Cited

U.S. PATENT DOCUMENTS

| 4,739,528 | A | * | 4/1988 | Allen ........................ 296/100.16 |
| 4,852,291 | A | | 8/1989 | Mengo |
| 4,901,381 | A | | 2/1990 | Swergold |
| 5,035,012 | A | | 7/1991 | Westrich |
| 5,066,063 | A | * | 11/1991 | Mullally .................. 296/100.18 |
| 5,911,399 | A | | 6/1999 | Mannion |
| 6,390,309 | B1 | | 5/2002 | Tucker |
| 6,467,110 | B1 | | 10/2002 | Ketcher |
| 7,047,688 | B2 | | 5/2006 | Sandman, Jr. |
| 7,073,857 | B1 | * | 7/2006 | Bailey ........................ 297/217.7 |
| 8,475,096 | B2 | * | 7/2013 | Spencer et al. .......... 296/100.16 |
| 8,550,757 | B2 | * | 10/2013 | Anderson et al. ............. 410/104 |
| 8,573,678 | B2 | * | 11/2013 | Yue ........................ 296/100.15 |
| 2005/0251910 | A1 | | 11/2005 | Boyd |
| 2009/0205131 | A1 | * | 8/2009 | Bishop ............................. 5/118 |
| 2011/0083268 | A1 | * | 4/2011 | Finch et al. ...................... 5/127 |
| 2013/0228118 | A1 | * | 9/2013 | Feteih ........................... 114/355 |

* cited by examiner

*Primary Examiner* — Peter M Cuomo
*Assistant Examiner* — Brittany Wilson
(74) *Attorney, Agent, or Firm* — Fish & Richardson P.C.

(57) ABSTRACT

This document provides hammock systems and methods for using a hammock system. For example, a hammock support system can suspend a hammock over a vehicle by attaching first and second end connectors of a hammock to a pair of support structures, respectively, which are mated with corresponding receiving structures of a vehicle, respectively.

21 Claims, 5 Drawing Sheets

SUPPORTING A HAMMOCK ON A VEHICLE

TECHNICAL FIELD

This application generally relates to a hammock system, such as a hammock system for supporting a hammock on a vehicle.

BACKGROUND

Hammocks have been popularly used in various settings for relaxation and sleep. Their popularity likely stems from their unique design, relative simplicity, low cost, and, in some designs, portability. Hammocks are commonly used for resting outdoors without the mess and discomfort of lying directly on the ground. Hammocks can be found in various places from rural gardens and suburban yards to sandy beaches and camping sites under the shade of trees. They have even been used in the quarters of battleships. In general, hammocks require a frame or other support structure to which the ends of the hammock can be attached to suspend the hammock some height off the ground beneath it. In some instances, such as in some lawn and garden sets, the hammock is supported by a freestanding frame particularly adapted for use as a hammock support structure. In other uses, the hammock may simply be tied between two natural or pre-existing structures in a given setting, such as between two trees in a lawn, forest, or beach, for example.

SUMMARY

This document describes systems and techniques by which at least one hammock can be suspended from a vehicle. A hammock support system can suspend a hammock over a vehicle by attaching first and second end connectors of a hammock to a pair of support structures, respectively. In some embodiments, the support structures mate with preexisting physical features of the vehicle to secure the system and retain the support structures in an upright position. For example, recesses or other openings defined by the vehicle can be used to mate with and secure the hammock support system with sufficient strength to allow one or more persons to lay and swing in the hammock. In some particular implementations, a pair of support structures of the hammock support system can be inserted into stake pockets along the side of a flatbed trailer. In other implementations, the system can be used on a boat by inserting the support structures into fishing rod holders. One advantage of some systems and techniques described herein is the ability to quickly and easily setup and take down a hammock on a vehicle. For instance, truck drivers that spend substantial amounts of time driving or waiting for cargo and deliveries can park the truck and use the described systems and techniques to setup a hammock on their truck to rest outdoors when desired. Moreover, in some implementations the support structures for the hammock can be installed on the vehicle without other tools or hardware, and without mounting additional permanent structures on the vehicle or otherwise modifying the vehicle.

In one implementation, a method of using a hammock system may include inserting first and second hammock support structures into first and second receiving structures of a vehicle, respectively. The first and second receiving structures each may define an opening to mate with a vehicle connection adapter of one of the first and second hammock support structures. The method may further include suspending a hammock between the first and second support structures and above a surface of the vehicle by attaching first and second end connectors of the hammock to upper attachment members of the first and second support structures, respectively.

This and other implementations can optionally include one or more of the following features. The vehicle can include a flatbed trailer and the first and second receiving structures of the vehicle can each include a stake pocket of the flatbed trailer, and the surface of the vehicle includes a cargo deck of the flatbed trailer. The vehicle can include a boat and the first and second receiving structures of the vehicle can each include a rod holder that is adapted to receive a fishing rod. The vehicle can include a pickup truck and the first and second receiving structures of the vehicle can each include a stake pocket of the pickup truck. The first and second receiving structures can be located near or along a perimeter of the vehicle. Suspending the hammock between the first and second support structures can include attaching first and second ends of the hammock to respective attachment members on each of the first and second support structures. The attachment member can be rotated relative to one of the first receiving structure and the second receiving structure, and/or a height of at least one of the attachment members can be adjusted. Each of the attachment members can include at least one of a protrusion from the support structure, an eyelet, an aperture through the support structure, and a fitting connected to the support structure. The method can further include removing the first and second support structures from the first and second receiving structures of the vehicle, respectively, and storing the first and second support structures in a carrying case.

In one implementation, a hammock system may include a hammock having a first end connector and a second end connector. Also, the system may include first and second hammock support structures. Each of the first and second hammock support structures may include an upper attachment member to connect the respective hammock support structure to the first end connector or the second end connector of the hammock. Each of the first and second hammock support structures may also include a vehicle connection adapter configured to releasably mate with a corresponding mounting structure of a vehicle. The vehicle connection adapter may be spaced apart from the upper attachment member such that the upper attachment member of the respective hammock support structure is elevated above the vehicle connection adapter when the vehicle connection adapter releasably mates with the corresponding mounting structure of the vehicle.

This and other implementations can optionally include one or more of the following features. The system can further include the vehicle, and the vehicle can include a flatbed trailer. The mounting structure can include a stake pocket of the flatbed trailer, and the upper attachment member of each of the first and second hammock support structures can be elevated above a surface of the flatbed trailer when the vehicle connection adapter of each of the first and second hammock support structures releasably mates with the stake pocket. The surface of the vehicle can include a cargo deck of the flatbed trailer.

The vehicle can include a pickup truck. The mounting structure can include a stake pocket of the pickup truck, and the upper attachment member of each of the first and second hammock support structures can be elevated above a surface of the pickup truck when the vehicle connection adapter of each of the first and second hammock support structures releasably mates with the stake pocket. The surface of the vehicle can include a bed of the pickup truck.

The hammock system may optionally include the vehicle, which may include a boat. The mounting structure can include a rod holder that is adapted to receive a fishing rod, wherein the upper attachment member of each of the first and second hammock support structures is elevated above a surface of the vehicle when the vehicle connection adapter of each of the first and second hammock support structures releasably mates with the rod holder, and the surface of the vehicle comprises a gunwale of the boat.

The hammock system may optionally include the vehicle, which may include a plurality of mounting structures located near or along a perimeter of the vehicle. The upper attachment member can bend from the vehicle connection adapter at a first angle that is within fifteen degrees of a second angle defined by a longitudinal axis of the rod holder and a vertical axis.

In one implementation, a pair of hammock support structures for installing a hammock on a vehicle can include a vehicle connection adapter positioned proximate to a first end of the hammock support structure. The vehicle connection adapter may include a base member configured to releasably mate with a corresponding recess of a mounting structure of a vehicle. Each of the pair of support structures may also include an upper attachment member positioned proximate to a second end of the hammock support structure that is generally opposite from the first end. The upper attachment member may be configured to attach to a corresponding end connector of a hammock and to mechanically support the corresponding end connector of the hammock in an elevated position.

This and other implementations can optionally include one or more of the following features. The second end of at least one of the hammock support structures can be oriented substantially vertically when the vehicle connection adapter is releasably mated with the corresponding recess of the mounting structure of the vehicle. The vehicle connection adapter can be shaped to slidably insert into a stake pocket of a flatbed trailer. The vehicle connection adapter can be shaped to slidably insert into a rod holder of a boat that is adapted to receive a fishing rod. The vehicle connection adapter can be shaped to slidably insert into a stake pocket of a pickup truck. Each of the hammock support structures can include a central elongate shaft portion positioned between the vehicle connection adapter and the upper attachment member, wherein the central elongate shaft portion extends longitudinally at an angle outwardly from a vertical plane defined by a side surface of one of the vehicle connection adapter and the upper attachment member. The hammock support structures can be made of aluminum, stainless steel, a steel alloy, and/or a polymer material.

Other features and advantages will be apparent from the description and drawings, and from the claims.

BRIEF DESCRIPTION OF THE DRAWINGS

Like reference numbers and indications in the various drawings indicate like elements.

DETAILED DESCRIPTION

Figures 1A, 1B:
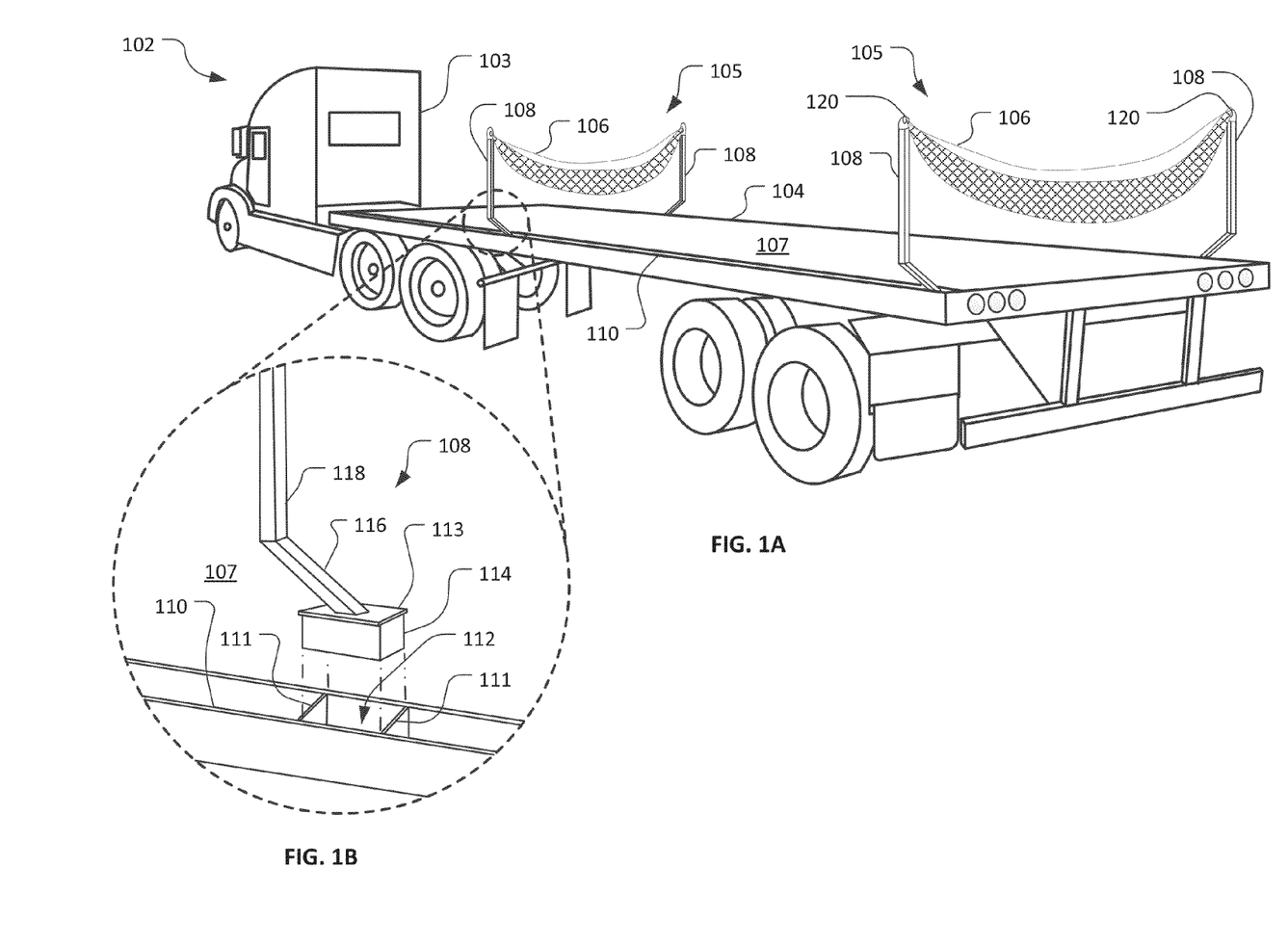
FIG. 1A depicts two example hammock systems that are adapted for installation on a flatbed trailer vehicle, in accordance with some implementations.
FIG. 1B is an enlarged view of an example arrangement for mating one of the hammock systems of FIG. 1A to the flatbed trailer.

FIG. 1A depicts two example hammock systems 105 for suspending a hammock 106 over a portion of a vehicle 102. According to one implementation, as depicted in FIG. 1A, the vehicle 102 can include a truck 103 connected to a flatbed trailer 104. In this embodiment, the hammock systems 105 each include the hammock 106 and a pair of hammock support structures 108. The hammock support structures 108 can operate, for example, as stanchions that are secured to the vehicle 102 and to which the hammock 106 can be connected and suspended above the vehicle 102.

The hammock system 105 is configured for use with one or more types of vehicles 102. As shown in FIG. 1, the vehicle 102 may include a truck 103, a flatbed trailer 104, or a combination thereof. For example, the hammock system 105 can be secured to the flatbed trailer 104 that is a part of the truck 103. The vehicle 102 can also include the flatbed trailer 104 when it is disconnected from the truck 103 or any other motor vehicle. For example, the hammock system 105 may be configured for use with a variety of types and sizes of flatbed trucks, such as shorter, two-axle trucks with a fixed trailer, larger trucks that have three or more axles (including trailer axles), or a combination thereof. The trailer 104 can also be an articulating trailer that can be towed or disconnected from the truck 103.

Flatbed trailers 104, such as the one depicted in FIGS. 1A and 1B, may include rub rails 110 on each side of the trailer 104. The rub rails 110 run along a length of each side of the trailer 104. In some cases, the rub rails 110 run substantially entirely from the front of the trailer 104 to the rear of the trailer 104. The rails 110 may have a standard or universal configuration across a variety of different trailers. The rails 110 may be made of a metal or metal alloy such as steel, and are spaced from a side edge of the trailer 104 by a few inches. The space between the rails 110 and the side edges of the trailer's 104 cargo deck 107 allow devices such as chains, straps, or pipe stakes to fit between the space, for example, to secure cargo during transport and/or loading.

The hammock system 105 can be mated to one or more recesses of the vehicle 102 so that, for example, the system 105 is anchored into a secured positioned relative to the vehicle. In some embodiments, the recesses may each be defined by at least three sidewalls with an upper opening and bottom that is either opened or closed. In some implementations, the recesses may be defined by a physical feature that is integrated with and/or built-in to the vehicle 102 (e.g., the rub rails 110). In some implementations, separate structures may be added on or connected to the vehicle 102 that form one or more of the recesses.

According to the implementation depicted in FIGS. 1A and 1B, one or more of the recesses can be a stake pocket 112 of the flatbed trailer 104. In such embodiments, the recess 112 is defined by four sidewalls with an open top and bottom, and may be sized to receive a wood board such as a "2×4" piece of lumber. For example, the stake pockets 112 on the flatbed trailer 104 can generally be between about 1.5×3.5 inches and 2×4 inches. The stake pockets 112 on the flatbed trailer 104 can be formed between the side edges of the trailer 104 and the rub rail 110, which can define two of the stake pocket sidewalls. Connecting plates 111 that run perpendicularly between the rub rail 110 and the side edge of the trailer 104 can form the remaining two sidewalls of the stake pocket 112. In some implementations, stake pockets 112 may be provided elsewhere on the vehicle 102, and may be formed from brackets mounted to a surface of the vehicle 102, for example.

As previously described, the hammock system 105 in this embodiment includes the pair of stanchions 108 to which the hammock 106 is attached and suspended between. Each of the stanchions 108 can be anchored to the vehicle by mating with the recess 112, such as the stake pocket of the trailer 104 in this example. The stanchion 108 has a base portion 114 that has a complementary shape to the stake pocket 112, and that is configured to be slidably received in the stake pocket 112. A flange 113 above the base portion 114 rests atop the stake pocket 112 when the stanchion 108 is mated with the stake pocket 112. The flange provides a hard-stop to vertically position the stanchion 108, thereby preventing the stanchion 108 from sliding below a determined depth in the stake pocket 112. In this way, the stake pocket 112 supports the stanchion 108 in a substantially vertical position so that a pair of the stanchions 108 is capable of suspending a hammock 106 and supporting the weight of one or more persons in the hammock 106.

As illustrated in FIG. 1A, the hammocks 106 can be suspended above a surface of the vehicle 102 and the respective base portions 114 of the stanchions 108. The surface of the vehicle 102 can include an interior or exterior surface of the vehicle 102, such as the cargo deck 107 of the flatbed trailer 104 having the rub rails 110.

In some implementations, the pair of stanchions 108 can be secured on opposite sides of the vehicle 102, such as across a width of the flatbed trailer 104. A common width of flatbed trailers 104 is 8.5 feet, and the stanchions 108 can be shaped to extend outwardly from one or both of the vertical planes of the respective sides of the trailer 104 to increase the distance between attachment points on the stanchions 108, so that a longer hammock 106 can be used. Shorter hammocks 106 can also be used, for instance, by reversing the orientation of one or both of the stanchions 108 to extend inwardly from one or both of the vertical planes of the respective sides of the trailer 104. The stanchions 108 can also be configured without angling. In other words, in alternative implementations the stanchions can have a substantially linear shape that extends generally vertically from the corresponding recesses 112 of the vehicle 102.

The hammock system 105 can be used in various orientations in relation to the vehicle 102. For example, a user can change the orientation of the system 105 by removing one or more of the stanchions 108 (if the stanchions 108 were previously installed) from respective stake pockets 112, and inserting the stanchions 108 into one or more other stake pockets 112 on the vehicle 102. For instance, rather than suspending the hammock 106 across the flatbed trailer 104 from a right side of the trailer 104 to a left side of the trailer 104, the hammock 106 may also be suspended along the length of a particular side of the flatbed trailer 104 by installing the pair of stanchions 108 in separate stake pockets 112 on the same side of the trailer 104. At times, a portion of the cargo deck 107 on the flatbed trailer 104 may be filled with cargo, and the hammock system 105 can be setup near an unfilled portion of the trailer 104. As the loading changes and cargo is repositioned from one portion of the trailer 104 to another, the hammock system 105 can be relocated accordingly. In some implementations, multiple hammock systems 105 can be setup on a vehicle 102. For example, when a driver and one or more passengers each desire rest, separate hammock systems 105 can be setup for each person.

Various types of hammocks 106 can be used in the hammock system 105. For instance, spreader hammocks, Mayan hammocks, and jungle hammocks may all be compatible with the hammock system 105. Moreover, the hammock 106 may be made of various fabric materials, including cotton, nylon, polyester, rope, reinforced polymers, or a combination thereof. Because particular types of hammocks may be more suitable for different conditions, environments, and/or people, the hammock system 105 can be configured to operate any of a variety of different hammock types that are interchangeably installed to the stanchions 108. For instance, a wider hammock 106 may be installed where more than one person intend to use the hammock 106. Likewise, a hammock 106 with a tarp or mosquito cover may be used to increase privacy, block sun or rain, and/or to keep out pests.

Figure 2A:
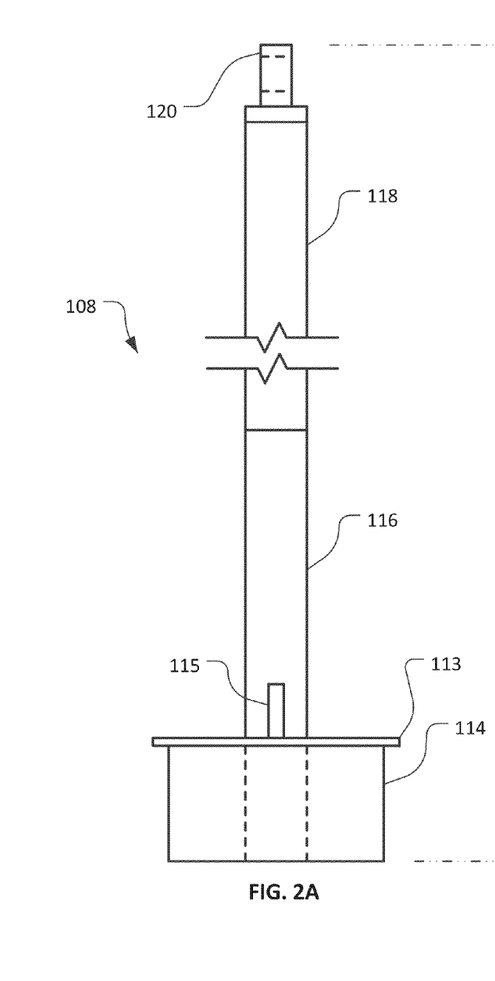
FIGS. 2A and 2B depict front and side views, respectively, of a hammock support structure of the hammock systems of FIG. 1A, in accordance with some implementations.
Figure 2B:
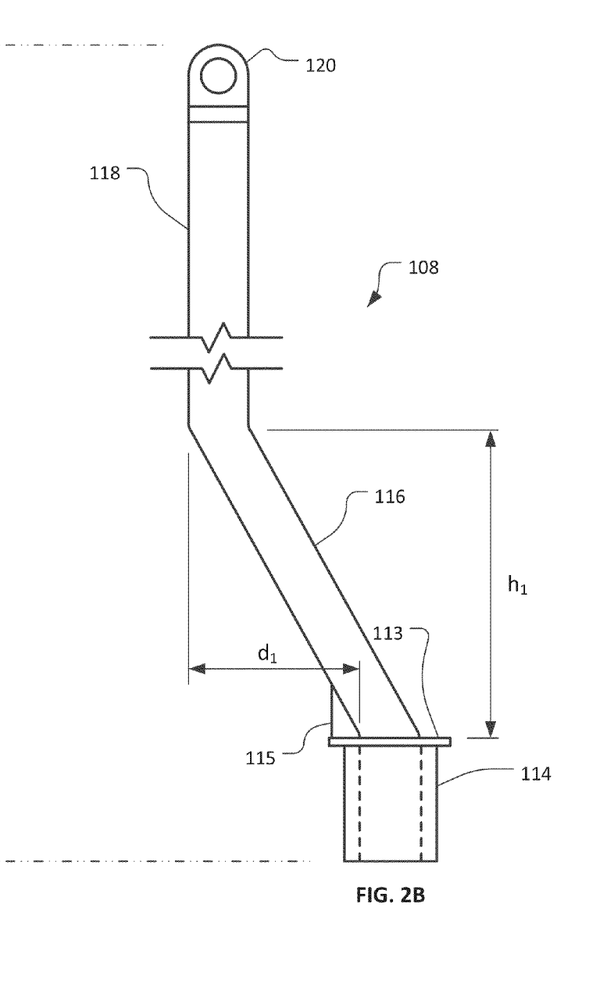

FIGS. 2A and 2B depict front and side views, respectively, of the hammock support structure 108 according to one example implementation. As described previously in reference to FIG. 1A, the hammock support structure 108 can operate as a stanchion that is used as part of the hammock system 105 to install the hammock 106 on the vehicle 102, such as the flatbed trailer 104. The stanchion 108 can include one or more of the base portion 114, flange 113, structural reinforcement 115, elongate angled member 116, extension portion 118, and attachment member 120. These components of the stanchion 108 may be mechanically connected (e.g., via fasteners, welding, press-fitting, threading, use of adhesives, or the like), or integrally formed as a unitary structure (e.g., by a machining, molding, or casting process). The stanchion 108 may be made of any suitable material or combinations of materials including but not limited to aluminum, aluminum alloys, stainless steel, steel alloys, fiberglass, graphite, polymer materials, or a combination thereof. Stainless steel, aluminum, or galvanized steel may be well-suited, for example, to protect against corrosion. Aluminum, fiberglass, or plastic may be well-suited to reducing the weight of the stanchions 108 in some examples.

The base portion 114 is located at or near a first end of the stanchion 108, and is received in a recess of the vehicle in use. In the implementation shown, the base portion 114 is generally rectangular and shaped to mate with the recess 112 in the form of the stake pocket on a flatbed trailer 104 (refer to FIG. 1B). In general however, the base portion 114 can be configured as a vehicle connection adapter in any shape such that it complementarily mates with a suitable recess on a vehicle. The base portion 114 may be constructed as a hollow shell with sidewalls, or may be solid or contain other material in its interior to, for example, provide additional weight to the stanchion 108. The base portion 114 can be fabricated by extrusion, welding, machining, molding, casting, and the like, or by a combination of such techniques.

The base portion 114 is sized slightly smaller than the recess so that the base portion 114 can readily slide into the recess, but is still large enough to prevent the stanchion 108 from rotating or tilting significantly. For example, in some embodiments the stanchions 108 may be prevented from rotating, tilting, and/or wobbling more than five degrees in any direction from a vertical axis of the recess 112 when the stanchion 108 is mated with the vehicle 102. In some implementations, the length and width of the base portion 114 beneath the flange 113 are about ⅛-inch or less smaller than the corresponding recess dimensions. For example, for a stanchion 108 configured to be received in a 3.5×1.5 inch stake pocket, the base portion 114 may be approximately 3.375×1.375 inches. However, in other implementations more or less clearance may be provided. The base portion 114 is also sufficiently deep to provide adequate support against torque and other stresses when the hammock is in use. For example, in some implementations the depth of the base portion 114 may approximately equal the vertical depth of sidewalls defining the recess that receives the base portion 114. However, in other implementations the depth of the base portion 114 is greater than or less than the vertical depth of a sidewalls defining the recess that receives the base portion 114.

The flange 113 in this embodiment defines an upper limit of the base portion 114. The flange 113 can be a plate that is connected to the base portion 114 and that provides a small overhang around at least a portion of a perimeter of the base portion 114. The overhang is sufficiently large to interfere with at least a portion of a peripheral surface surrounding the recess to prevent the stanchion 108 from sliding through the recess beyond the depth of the base portion 114. For example, in reference to FIGS. 1A and 1B, when the stake pocket 112 on the flatbed trailer 104 receives the stanchion 108, the flange 113 can provide approximately ⅛-inch to approximately ½-inch overhang so that the overhang portion is configured to abut a top peripheral surface of the corresponding recess 112. In other implementations, more or less overhang can be used. In some implementations, the flange 113 may be welded or otherwise mechanically connected to the top of the base portion 114. Also, in other implementations, the flange 113 may extend from less that all peripheral sides of the base portion 114. For example, the flange 113 may extend from only two sides of the perimeter of the base portion 114.

Still referring to FIGS. 2A and 2B, the elongate angled member 116 extends upwardly away from the base portion 114 and the flange 113. The angled member 116 extends vertically by a height $h_1$ and horizontally by a distance $d_1$ from the base portion 114 or flange 113. The distance $d_1$ can represent the offset between horizontal positions of the attachment member 120 and the base portion 114. The distance $d_1$ provided by the elongate angled member 116 allows the distance between attachment points 120 of a pair of stanchions 108 to be greater than or less than the distance between the recesses of a vehicle, which are generally fixed. For example, in reference to FIG. 1A, a pair of stanchions 108 having elongate angled members 116 that each have an offset ($d_1$) of three inches may be installed on the flatbed trailer 104 to increase the distance between the attachment members 120 by six inches (two times $d_1$) from the distance between the corresponding stake pockets 112. Similarly, by reversing the orientation of the stanchions 108, the distance between the attachment members 120 can be reduced by six inches from the distance between the corresponding stake pockets 112 in which the stanchions 108 are installed. Alternatively, by reversing the orientation of just one of the stanchions 108, the distance between the attachment members 120 will equal the distance between the corresponding stake pockets 112.

The elongate angled member 116 may extend at an angle directly from the flange 113 or base portion 114, or the angle may start elsewhere along the length of the stanchion 108. In some implementations, the angled member 116 includes a central elongate shaft portion that extends longitudinally at an angle outwardly from a vertical plane defined by a side surface of the base portion 114 and the attachment member 120.

A structural reinforcement member 115 may connect between the elongate angled member 116 and the flange 113 or base portion 114. In some implementations, the structural reinforcement member 115 includes a gusset that is welded, bolted, riveted, or otherwise attached between the elongate angled member 116 and the flange 114 or base portion 114. In general, suitable reinforcement members may be included on other portions of the stanchion 108 as needed to enhance the strength and fatigue resistance of the stanchion 108.

An extension portion 118 can provide additional height to the stanchion 108. The extension portion 118 can be connected or formed along the length of the stanchion 108, such as between the attachment member 120 and the elongate angled member 116, or between the flange 113 or base portion 114 and the elongate angled member 116. In some implementations, the stanchion 108 can include multiple extension portions 118. The extension portions 118 generally extend along or parallel to a longitudinal axis of the base portion 114.

The extension portion 118 and elongate angled member 116 can be formed from metal piping or tubing in one example. The piping or tubing can have a cross-sectional shape that is square, round, rectangular, or other shapes. The pieces can be connected mechanically, such as by threads, slots and grooves, hinges, or removable pins that may allow for easy disassembly and compact storage; or they may be welded together for permanent attachment. In some implementations, one or more extension portions 118 and one or more elongate angled members 116 may be formed by bending a single continuous piece of piping or tubing at one or more points as appropriate.

The attachment member 120 is proximate to the upper most end of each stanchion 108 opposite from the base portion 114. The attachment member 120 provides a connection point between the stanchion 108 and an end connector of the hammock 106. In some implementations, the hammock 106 may attach directly to the attachment member 120. In some implementations, the end connector of the hammock 106 may include a separate suspension mechanism such as a rope, chain, or other device that connects between the attachment member 120 and the hammock 106 where, for example, additional slack is desired or required in suspending the hammock 106. The attachment member 120 depicted in FIGS. 2A and 2B includes a rounded piece with a circular aperture through the attachment member 120. In one example, the attachment member 120 can be an eye bolt, eyelet, or other fitting. The hammock end connector can connect to the attachment member 120 to secure the hammock 106. For instance, a rope or other line may loop through the aperture and be tied to the attachment member 120. Alternatively, a carabineer or other clip may similarly lock around the opening of the attachment member 120. In some implementations, the attachment member 120 is rotatable so that it can swivel about a longitudinal axis of the stanchion 108. The height of the attachment member 120 may also be adjustable, for example, by sliding and locking into position a telescoping portion of the stanchion 108.

The stanchion 108 can include finishes and features that may increase the aesthetic appeal, durability, safety, and/or convenience of the hammock system 105. For instance, the stanchion 108 may be powder coated or otherwise painted to improve its look and corrosion resistance. In some implementations, the stanchion 108 may be galvanized, or plated with chrome, nickel, or the like. In some implementations, the stanchion 108 may be made from anodized aluminum. For safety, the stanchion 108 can be padded. Safety notices may be packaged with the hammock system 105 and/or attached to the stanchion 108 that provide instructions for proper use of the system 105 and that may warn against unsafe uses of the system 105, such as may occur when the vehicle 102 is moving. The hammock system 105 can also be packed into a portable and compact carrying case for easy storage and transportation.

In another embodiment, a hammock system can be installed on a pickup truck that includes two or more recesses located along a surface of the box sidewalls that define the bed of the pickup truck. In some uses, the recesses are stake pockets used to secure cargo racks or covers on the pickup truck. Pickup trucks may include two or more stake pocket recesses with at least one located on each on the left and right sidewalls of the pickup truck box. In some examples, the stake pockets in the box sidewall of the pickup truck have a substantially rectangular opening of approximately 1.75×2.33 inches. In other examples, the stake pocket openings may have other sizes. The stanchions of the hammock system can be sized slightly smaller than the openings of the stake pockets, so that the stanchions can slide into a respective pair of stake pockets to support the stanchions in substantially vertical positions. The hammock system can also include one or more hammocks 106 connected between the pair of stanchions and suspended over the pickup truck. The hammock 106 can be suspended across a width of the pickup truck, along a side of the pickup truck, or diagonally, according to locations of the particular stake pockets used to support the stanchions. As described above with reference to FIGS. 1A-2B, the stanchions may include a flange or similar bracket to secure the stanchions in respective stake pockets in the box sidewall of the pickup truck. The stanchions may include an attachment member that is proximate a top end of the stanchion to which the hammock 106 can connect. In some embodiments, the attachment member can be offset from a base portion of the stanchion by virtue of an elongate angled member of the stanchion.

Figures 3A, 3B:
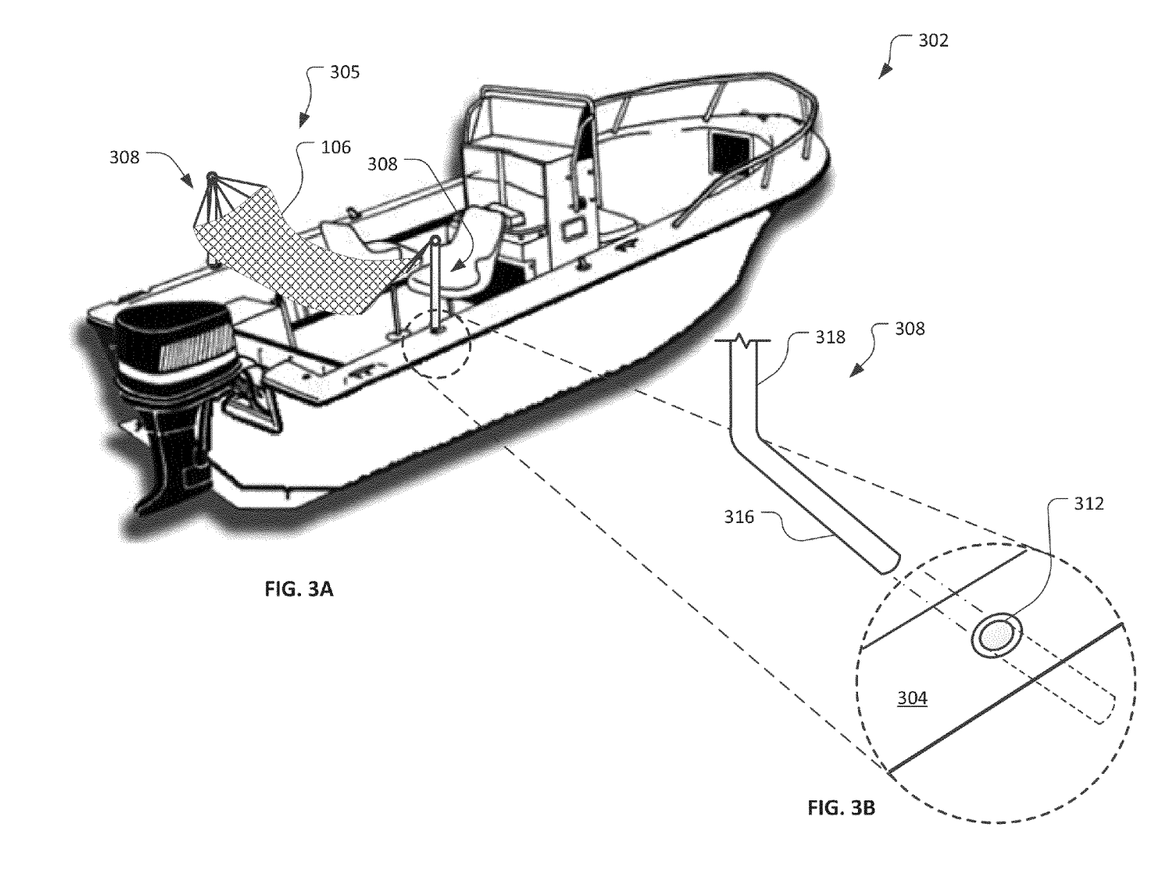
FIG. 3A depicts an example hammock system that is adapted for installation on a boat vehicle, in accordance with some implementations.
FIG. 3B is an enlarged view of an example arrangement for mating the hammock system of FIG. 3A to a rod holder built into a gunwale of the boat.
Figure 4:
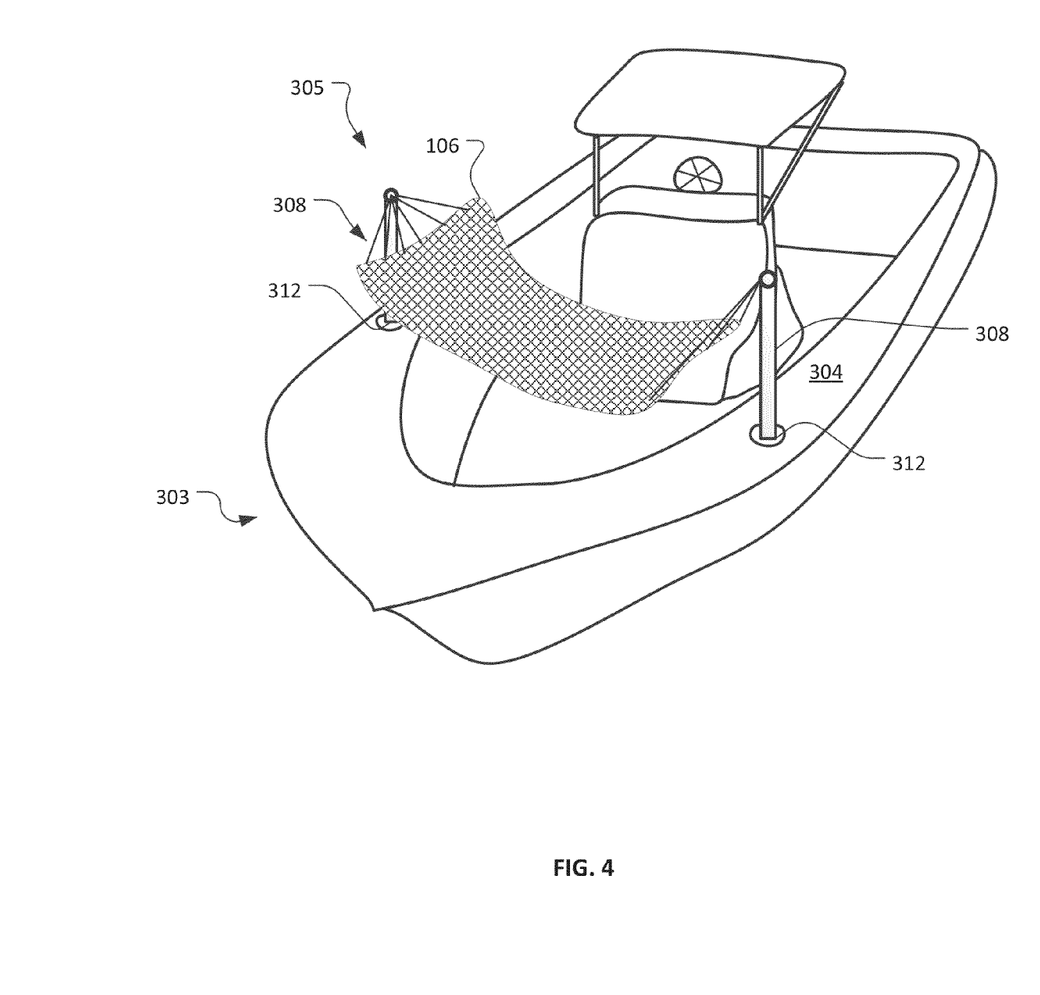
FIG. 4 depicts an example hammock system installed near the bow of a boat vehicle, in accordance with some implementations.

Referring now to FIGS. 3A, 3B, and 4, another example of a hammock system 305 can be configured to install on one or more boats 302 and 303. The boats 302 and 303 in these embodiments include one or more recesses or receiving structures that receive and mate with a pair of hammock support structures 308 of the hammock system 305. In the implementations shown, the receiving structures are rod holders 312, which are popularly found in fishing boats, sporting boats, cruisers, and other watercraft. As such, the hammock support structures 308 can mate with the rod holders 312 and operate as stanchions to support the hammock 106 during use. In other implementations, the receiving structures can be other types of recesses, openings, holes, and the like.

The rod holders 312 can be installed in an opening in the gunwale 304 of the boats 302 and 303. Particular rod holders 312 may include an elongated metal or plastic tube that extends below the surface of the gunwale 304 at an angle. A flange at or near the top of the rod holders 312 can be connected to the gunwale 304 to secure the rod holders 312 in place. The hammock system 305 can mate with flush-mounted rod holders 312 and/or with externally mounted rod holders 312 that attach to other surfaces of the boats 302 and 303, such as a railing or a wall. The size and configuration of rod holders 312 can vary in some cases. However, the barrel of the rod holder 312 commonly has an inside diameter of approximately 1.625 inches, and its length may range from about five to ten inches. When installed, the rod holder 312 is angled between about 15 degrees and 30 degrees from vertical. The angle of some particular rod holders can extend beyond this range in some examples. In such cases, the hammock system 305 can be adapted to properly function in concert with the particular rod holders.

The hammock system 305 can be setup in various configurations in the boats 302 and 303. For example, the hammock 106 can be suspended across the width of the boat, with one stanchion 308 installed in a rod holder 312 on the starboard side of the boat, and the other stanchion 308 installed in a rod holder 312 on the port side of the boat. Stanchions 308 can mate with an appropriate rod holder 312 or other recess wherever they are available on the boat. In some implementations, both stanchions 308 of the hammock system 305 can be installed behind the console toward the stern of the boat 302, as depicted in FIG. 3A. The hammock system 105 can also be installed in front of the console near the bow of the boat 303, as depicted in FIG. 4. In some configurations, both stanchions 308 can be installed on the same side of the boats 302 or 303, or the hammock 106 can be suspended diagonally across the boats 302 or 303. In each configuration, the pair of stanchions 308 suspends the hammock 106 above a surface of the boats 302 and 303. The surface of the boat may include a deck of the boat such as the interior floor of the cabin or deck floor, the gunwale 304, and/or another surface of the boats 302 and 303.

Figure 5A:
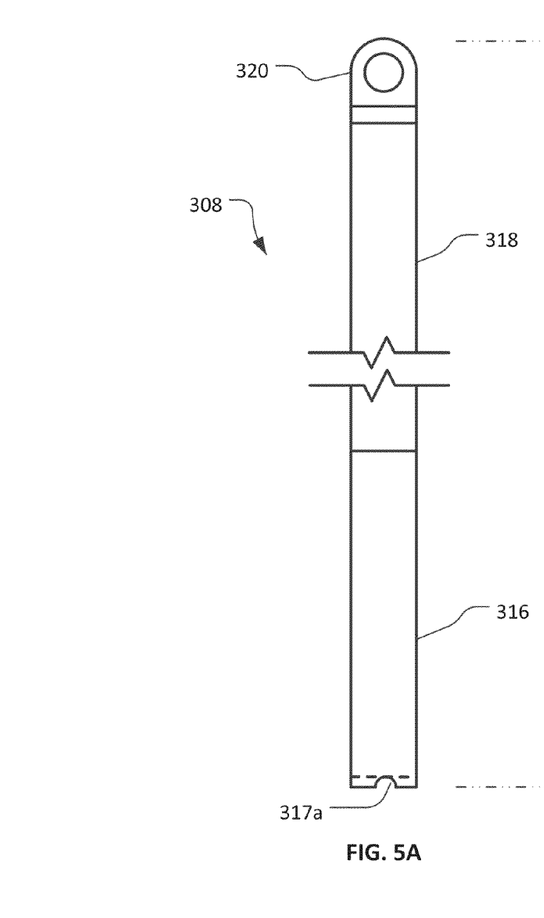
FIGS. 5A and 5B depict front and side views, respectively, of a hammock support structure of the hammock systems of FIGS. 3A and 4, in accordance with some implementations.
Figure 5B:
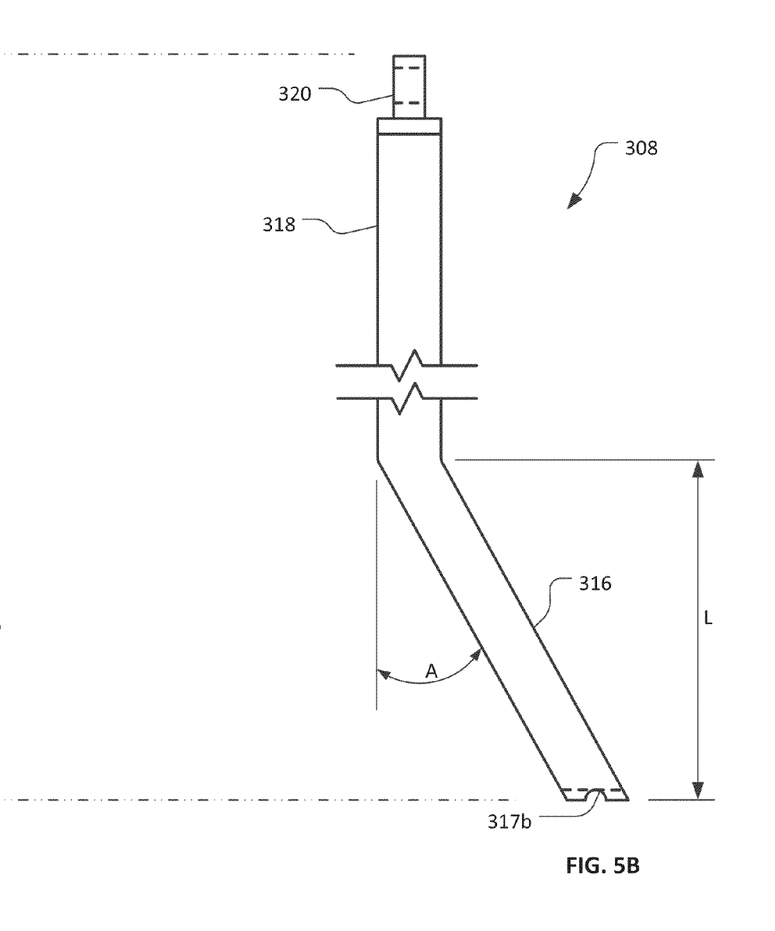

FIGS. 5A and 5B depict front and side views, respectively, of one of the stanchions 308 from FIGS. 3A, 3B, and 4. The stanchion 308 is configured to mate with a rod holder 312 or other recess or receiving structure on the boats 302 and 303. The stanchion 308 includes an elongate angled member 316, base notches 317a-b, an extension portion 318, and an attachment member 320. Like the stanchion 108 described in reference to FIGS. 2A and 2B that is configured to mate with a stake pocket 112, the stanchion 308 can be made of materials such as aluminum, aluminum alloys, stainless steel, steel, a steel alloy, fiberglass, a polymer material, or a combination thereof. Stainless steel, anodized aluminum, chrome-plated steel, or galvanized steel may be used, for example, to protect against corrosion. Aluminum, fiberglass, or plastic may be used for a lighter design. The component portions and members of the stanchion 308 may be mechanically connected or integrally formed as a unitary structure, as previously described in reference to stanchion 108.

The elongate angled member 316 is configured to slidably insert into and mate with the rod holder 312. The angled member 316 is substantially straight and has an outer diameter slightly smaller than the inner diameter of the rod holder 312. For example, for a rod holder 312 having an inner diameter of 1.625 inches, the outer diameter of the angled member 316 may be approximately 1.5 inches. The length, 'L', of the angled member 316 is sufficient to secure the stanchion 308 when the hammock 106 is in use by one or more persons. In some implementations, the angled member 316 can extend the full length of the rod holder 312 and engage the rod holder 312 at its base. To prevent rotation of the stanchion 308, one or more notches 317a-b or other locking mechanism at the base of the angled member 316 can be configured to engage with bar members or protrusion that may be located at the end of the rod holder 312.

The extension portion 318 extends above the angled member 316 at an angle, 'A', that can correspond to the angle of the rod holder 312. In some implementations, the angle 'A' between the angled member 316 and the extension portion 318 may be fixed, and the angle 'A' may be designed according to an average or expected angle of one or more different rod holders 312. In some implementations, the angle 'A' is within plus/minus ten degrees of the angle of the rod holder 312 that is defined by a longitudinal axis of the rod holder 312 and a vertical axis. When the stanchion 308 is inserted into the rod holder 312, the extension portion 318 protrudes generally vertically above the rod holder 312 such that the attachment member 320 is positioned at an appropriate height to suspend the hammock 106. The length of the extension portion 318 can be adjustable, for instance, by inserting a first part of the extension portion 318 into a larger second part of the extension portion 318 and coupling the first part at various extension positions relative to the second part like a tent pole.

The attachment member 320 is located proximate to the upper end of the stanchion 308. The attachment member 320 provides a connection point between the stanchion 308 and an end of the hammock 106. In some implementations, a separate end connector such as a rope, chain, or other line may connect between the attachment member 320 and the hammock where, for example, additional slack is desired or required in suspending the hammock 106. Similar to the depiction in FIGS. 2A and 2B, the attachment member 320 includes a rounded piece with an opening through the attachment member 320. In one example, the attachment member 320 can be an eye bolt, an eyelet, and/or another fitting. A corresponding mating structure from the end of the hammock 106 or other suspension mechanism can connect to the attachment member 320 to secure the hammock 106. For instance, a rope or other line may loop through the opening and be tied to the attachment member 320. Likewise, a carabineer or other clip may similarly lock around the opening of the attachment member 320. In some implementations, the attachment member 320 may be rotatable so that it can swivel about a longitudinal axis of the extension portion 318. In some embodiments, the height of the attachment member 320 may be adjusted.

While this specification contains many specific implementation details, these should not be construed as limitations on the scope of the claims, but rather as descriptions of features specific to particular implementations of particular embodiments. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular implementations of the subject matter have been described. Other implementations are within the scope of the following claims.

What is claimed is:

1. A method of using a hammock system comprising:
   inserting a first hammock support structure into a first pre-defined pocket of a vehicle by sliding a base portion of the first hammock support structure into engagement with the first pre-defined pocket of the vehicle and into a fixed position relative to the first pre-defined pocket;
   inserting a second hammock support structure into a second pre-defined pocket of the vehicle by sliding a base portion of the second hammock support structure into engagement with the second pre-defined pocket of the vehicle and into a fixed position relative to the second pre-defined pocket; and
   suspending a hammock between the first and second hammock support structures and above a surface of the vehicle by attaching a first end connector at a first end of the hammock to an upper attachment member of the first support structure, and by attaching a second end connector at a second end of the hammock opposite the first end to an upper attachment member of the second support structure, so that a length of the hammock from the first end to the second end extends between the first hammock support structure and the second hammock support structure when the hammock is suspended,
   wherein the first hammock support structure and the second hammock support structure are each made of a rigid material.

2. The method of claim 1, wherein the vehicle includes a flatbed trailer, the first and second pre-defined pockets of the vehicle each comprises a stake pocket of the flatbed trailer, and the surface of the vehicle comprises a cargo deck of the flatbed trailer.

3. The method of claim 1, wherein the vehicle comprises a boat and the first and second pre-defined pockets of the vehicle each comprises a rod holder that is adapted to receive a fishing rod.

4. The method of claim 1, wherein the vehicle comprises a pickup truck, the first and second pre-defined pockets of the vehicle each comprises a stake pocket on the pickup truck, and the surface of the vehicle comprises a bed of the pickup truck.

5. The method of claim 1, wherein suspending the hammock between the first and second hammock support structures comprises attaching the first and second ends of the hammock to respective attachment members on each of the first and second hammock support structures.

6. The method of claim 5, wherein the attachment member is rotatable relative to one of the first and second pre-defined pockets of the vehicle.

7. The method of claim 5, further comprising adjusting a height of at least one of the attachment members.

8. The method of claim 1, further comprising removing the first and second hammock support structures from the first and second pre-defined pockets of the vehicle, respectively, and storing the first and second support structures in a carrying case.

9. A hammock system comprising:
   a hammock having a first end connector and a second end connector, the first end connector being located at a first end of the hammock, the second end connector being located at a second end of the hammock opposite the first end of the hammock, wherein a length of the hammock extending from the first end to the second end is arranged to be suspended using the first and second end connectors; and
   first and second hammock support structures, wherein each of the first and second hammock support structures is made of a rigid material, wherein each of the first and second hammock support structures includes an upper attachment member to connect the respective hammock support structure to the first end connector or the second end connector of the hammock, wherein each of the first and second hammock support structures includes a vehicle connection adapter configured to releasably mate with a corresponding vehicle pocket of a vehicle, wherein the vehicle connection adapter is spaced apart from the upper attachment member such that the upper attachment member of the respective hammock support structure is elevated above the vehicle connection adapter when the vehicle connection adapter releasably mates with the corresponding vehicle pocket of the vehicle.

10. The hammock system of claim 9, further comprising the vehicle, wherein the vehicle includes a flatbed trailer, the vehicle pocket of the vehicle comprises a stake pocket of the flatbed trailer, and wherein the upper attachment member of each of the first and second hammock support structures is elevated above a surface of the flatbed trailer when the vehicle connection adapter of each of the first and second hammock support structures releasably mates with the stake pocket, the surface of the vehicle comprising a cargo deck of the flatbed trailer.

11. The hammock system of claim 9, further comprising the vehicle, wherein the vehicle comprises a boat, the vehicle pocket of the vehicle comprises a rod holder that is adapted to receive a fishing rod, wherein the upper attachment member of each of the first and second hammock support structures is elevated above a surface of the vehicle when the vehicle connection adapter of each of the first and second hammock support structures releasably mates with the rod holder, and the surface of the vehicle comprises a gunwale of the boat.

12. The hammock system of claim 11, wherein the upper attachment member is bent from the vehicle connection adapter at a first angle that is within fifteen degrees of a second angle defined by a longitudinal axis of the rod holder and a vertical axis.

13. The hammock system of claim 9, further comprising the vehicle, wherein the vehicle comprises a pickup truck, the vehicle pocket of the vehicle comprises a stake pocket of the pickup truck, and wherein the upper attachment member of each of the first and second hammock support structures is elevated above a surface of the pickup truck when the vehicle connection adapter of each of the first and second hammock support structures releasably mates with the stake pocket, the surface of the vehicle comprising a bed of the pickup truck.

14. A pair of hammock support structures for installing a hammock on a vehicle, each hammock support structure being made of a rigid material and comprising:
 a vehicle connection adapter positioned proximate to a first end of the hammock support structure, the vehicle connection adapter comprising a base member configured to releasably mate with a corresponding vehicle pocket of a vehicle; and
 an upper attachment member positioned proximate to a second end of the hammock support structure that is generally opposite from the first end of the hammock support structure, the upper attachment member being configured to attach to a corresponding end connector of a hammock and to mechanically support the corresponding end connector of the hammock in an elevated position when the hammock is suspended along its length from a first end of the hammock to a second end of the hammock.

15. The pair of hammock support structures of claim 14, wherein the second end of at least one of the hammock support structures is oriented substantially vertically when the vehicle connection adapter is releasably mated with the corresponding vehicle pocket of the vehicle.

16. The pair of hammock support structures of claim 14, wherein the vehicle connection adapter is shaped to slidably insert into a stake pocket of a flatbed trailer or a pickup truck.

17. The pair of hammock support structures of claim 14, wherein the vehicle connection adapter is shaped to slidably insert into a rod holder of a boat adapted to receive a fishing rod.

18. The pair of hammock support structures of claim 14, wherein each of the hammock support structures comprises a central elongate shaft portion positioned between the vehicle connection adapter and the upper attachment member, wherein the central elongate shaft portion extends longitudinally at an angle outwardly from a vertical plane defined by a side surface of one of the vehicle connection adapter and the upper attachment member.

19. The method of claim 1, wherein:
 the first hammock support structure has a flange that abuts at least a portion of a top surface of the first pre-defined pocket in the fixed position so as to vertically support the first hammock support structure in the fixed position, and
 the second hammock support structure has a flange that abuts at least a portion of a top surface of the second pre-defined pocket in the fixed position so as to vertically support the second hammock support structure in the fixed position.

20. The hammock system of claim 9, wherein each of the first hammock support structure and the second hammock support structure includes a flange at a location along the respective hammock support structure above the vehicle connection adapter, the flange being configured to abut a top surface of the corresponding vehicle pocket of the vehicle when the respective hammock support structure is mated with the corresponding vehicle pocket so as to support the respective hammock support structure in an elevated position above a surface of the vehicle.

21. The pair of hammock support structures of claim 14, wherein each hammock support structure in the pair of hammock support structures further comprises a flange that is located at a position along the respective hammock support structure above the vehicle connection adapter and that is configured to abut a top surface of the corresponding vehicle pocket of the vehicle for the respective hammock support structure so as to support the hammock support structure above a surface of the vehicle.

* * * * *